United States Patent

Nakaya et al.

[11] Patent Number: 5,956,376
[45] Date of Patent: Sep. 21, 1999

[54] APPARATUS FOR VARYING A SAMPLING RATE IN A DIGITAL DEMODULATOR

[75] Inventors: Kazuyoshi Nakaya; Yoshiyuki Tabata, both of Kanagawa, Japan

[73] Assignee: Murata Mfg. Co., Ltd., Kyoto, Japan

[21] Appl. No.: 08/775,116

[22] Filed: Dec. 30, 1996

Related U.S. Application Data

[62] Division of application No. 08/345,665, Nov. 28, 1994.

[30] Foreign Application Priority Data

Nov. 29, 1993  [JP]  Japan ................... 5-298450

[51] Int. Cl.⁶ .................................................. H04L 27/06
[52] U.S. Cl. ................... 375/340; 371/5.1; 455/164.2; 375/344
[58] Field of Search ........................... 375/316, 340, 375/344, 355; 371/5.4, 5.1, 5.2, 28; 329/304, 306; 324/76.38; 455/67.3, 226.3, 226.2, 164.1, 164.2, 182.1, 182.2, 192.1, 192.2

[56] References Cited

U.S. PATENT DOCUMENTS

| | | | |
|---|---|---|---|
| 4,028,626 | 6/1977 | Motley et al. | 375/355 |
| 4,514,697 | 4/1985 | York | 375/340 |
| 4,704,582 | 11/1987 | Dixon et al. | |
| 4,788,696 | 11/1988 | Sakane et al. | 375/340 |
| 4,991,184 | 2/1991 | Hashimoto | 375/222 |
| 4,998,264 | 3/1991 | Woodward | 375/371 |
| 5,157,694 | 10/1992 | Iwasaki et al. | 375/329 |
| 5,280,538 | 1/1994 | Kataoka et al. | 375/200 |

OTHER PUBLICATIONS

Electronics Information and Communication Association Fall 1990 National Conference, Satoshi Denno et al., NTT Radio Communication Systems Laboratories.

*Primary Examiner*—Chi H. Pham
*Assistant Examiner*—Bryan Webster
*Attorney, Agent, or Firm*—Jordan and Hamburg LLP

[57] ABSTRACT

A framing and voice decoder part outputs an error information. An error ratio monitoring part monitors a bit error ratio based on the error information. A sampling rate changing part decides a sampling rate based on the bit error ratio and changes a number of bits of each shift register in the differential detector part to adapt the sampling rate. A sampling clock selector part selects one clock signal among four different frequency clock signals based on the decision of the sampling rate changing part and gives selected clock signal to the differential detector part as a sampling clock. The differential detector part makes demodulation in DQPSK (Differential Quadrilateral Phase Shift Keying). Since the error ratio is always maintained within a predetermined extent, a good voice quality is obtained. Since the sampling rate will not increase to unnecessarily high levels, power saving can be achieved and a consumption of batteries is reduced.

8 Claims, 3 Drawing Sheets

APPARATUS FOR VARYING A SAMPLING RATE IN A DIGITAL DEMODULATOR

This is a division of application Ser. No. 08/345,665, filed Nov. 28, 1994.

BACKGROUND OF THE INVENTION

1. Field of the Invention

The present invention relates to a digital radio communication system, and in particular, to a method for receiving digital radio signal and a digital radio signals receiver which can minimize a power consumption and maintain good voice quality. This invention is useful for digital mobile radiotelephones, digital cellular radiotelephones, digital cordless telephones, Personal HandyPhone system and the like.

2. Description of the Prior Art

FIG. 3 is a block diagram which shows the main parts of a conventional digital radio signal receiver.

Digital radio signal receiver 300 comprises radio frequency (RF) part 11 which amplifies radio frequency signals received by an antenna and converts them to intermediate frequency signals using predetermined frequency signals from a local oscillator, intermediate frequency (IF) part 12 which amplifies the intermediate frequency signals, differential detector part 13 designed for demodulation of differential quadrilateral phase shift keying (DQPSK), parallel-to-serial (P/S) converter part 14 which converts parallel signals to a serial signal, framing part and voice decoder part 15 which outputs error information and extracts voice data from the serial signal, speaker 16 which produces a voice based on the voice data, microprocessor unit (MPU) 17 which performs a retransmission request based on the error information, bit timing recovery (BTR) part 18 which supplies regenerated synchronous clock signal to P/S part 14, and clock generator 19 which produces a sampling clock 32$f$ to differential detector part 13 and synchronous clock to the BTR part 18.

A system similar to digital radio signal receiver 300 is disclosed for example in "Performance of π/4-Shift QPSK Baseband Differential Detector; NTT Radio Communication Systems Laboratories; The National Conference of the Institute of Electronics and Communications Engineers, Autumn 1990".

In conventional digital radio signal receiver 300, the frequency of the sampling clock 32$f$ fed to differential detector part 13 is 32 times higher than a symbol rate frequency, for example, 192 kHz. In this case, as the sampling rate frequency, for example, 6.144 MHz is high enough, a good voice quality is obtained when used for digital mobile radiotelephones, digital cellular radiotelephones, digital cordless telephones and the like.

However, when the sampling rate is maintained at the high frequency, a power consumption in differential detector part 13 increases and a problem arises that batteries contained within digital mobile radiotelephones, digital cellular radiotelephones, digital cordless telephones and the like are consumed faster. On the other hand, if the sampling rate frequency is maintained low, power consumption in the differential detector part 13 decreases. However, the voice quality becomes worse because a stability against a fading, multipath and similar effects becomes low.

SUMMARY OF THE INVENTION

The object of the invention is to provide a digital radio communication systems which can minimize a power consumption and maintain a good voice quality.

According to one aspect of the invention a digital radio communication system comprises a digital radio signals receiver. The receiver includes a differential detector, a framing portion and voice detector, an error ratio monitor, a sampling rate changing module and a sampling clock selector.

The differential detector for demodulation of DQPSK signals, which are used in a digital radio signal receiver, employs plural shift registers which are adapted to change a number of bits of each shift register. A framing portion and voice detector generates error information and extracts voice data from the serial signal, and converts I and Q parallel output signals of the differential detector to serial signals.

An error ratio monitor detects em error information regarding digital demodulation and calculates a bit error ratio E on the basis of the error information of the framing portion and voice detector. A sampling rate changing module changes a sampling rate for digital demodulation based on a signal from the error ratio monitor. The sampling rate is shifted to a higher frequency than a present frequency when the error ratio exceeds a specified upper limit, for example a bit error ratio of $10^{-2}$, and a lower frequency when the error ratio falls below a specified lower limit, for example a bit error ratio of $10^{-3}$. A sampling clock selector supplies a selected preferable sampling clock signal, determined by the sampling rate changing module, to the differential detector. The sampling clock signal has a frequency of N (N is an integer) times higher than a symbol rate frequency.

In the configuration described above, the error ratio may be, for example, a frame error ratio or similar in the framing portion and voice detector. Additionally the specified upper limit is generally greater than the specified lower limit, however, the specified upper limit may be equal to the specified lower limit.

The present invention is applied to digital modulation systems such as π/4-shift differential quadrilateral phase shift keying (π/4 DQPSK), differential quadrilateral phase shift keying (DQPSK), quadrilateral phase shift keying (QPSK), phase shift keying (PSK), quadrilateral amplitude modulation(QAM), gaussian minimum shift keying (GMSK), and minimum shift keying (MSK).

In the digital radio signal receiver of the invention, when the error ratio exceeds the specified upper limit, the sampling rate for digital demodulation is changed to higher frequency than a sampling frequency which is actually used. As a result, the stability against fading, multipath and similar effects becomes higher and the error ratio is decreased. When the error ratio falls below the specified lower limit, the sampling rate for digital demodulation is changed to a lower frequency. As a result, stability against fading, multipath and similar effects becomes lower and the error ratio is increased.

Therefore, the error ratio is kept between the specified upper and lower limits, and the power consumption power is minimized.

DETAILED DESCRIPTION OF THE PREFERRED EMBODIMENTS

Figure 1:
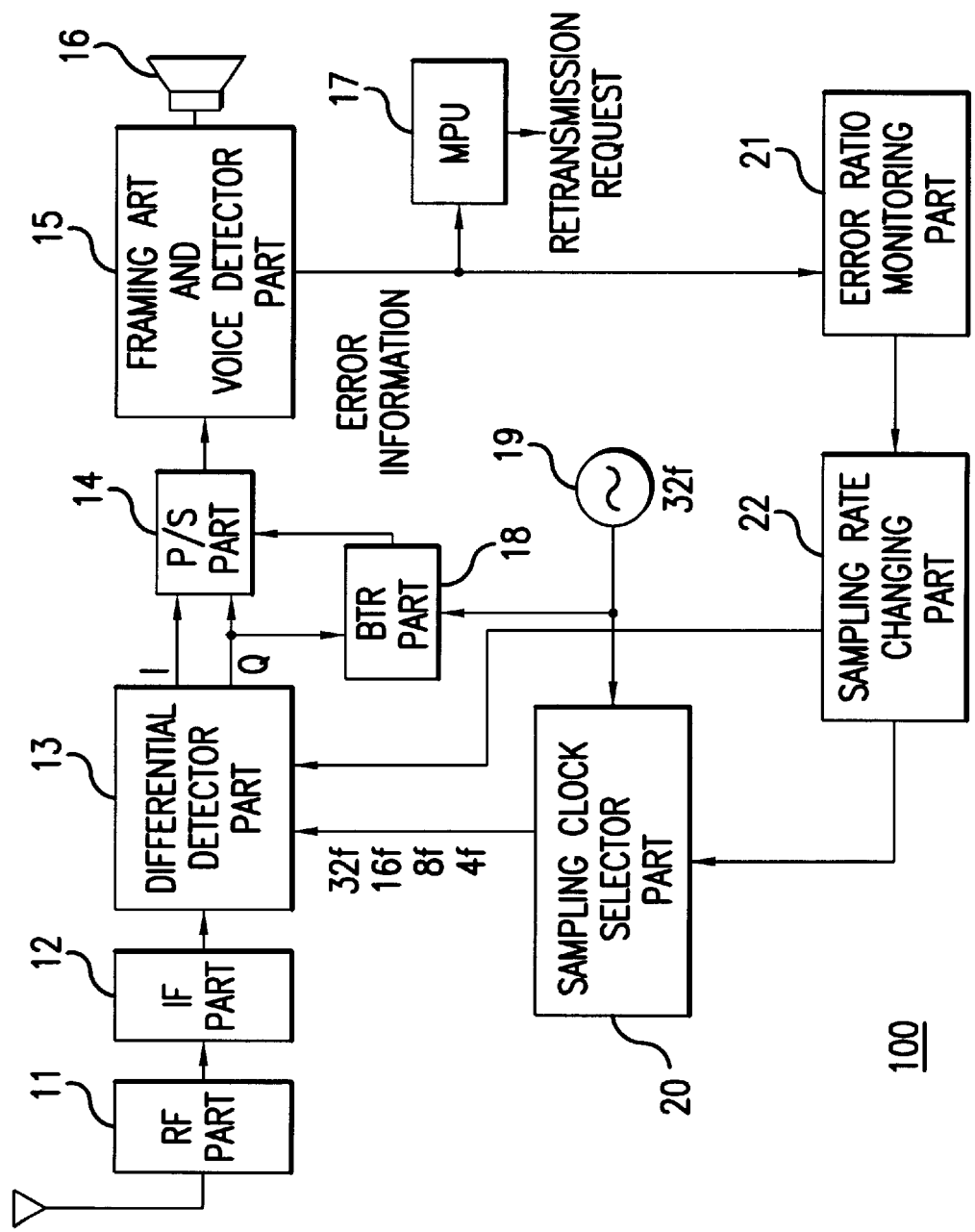
FIG. 1 is a block diagram showing the main parts of an embodiment of the digital radio signal receiver of the invention.

FIG. 1 is a block diagram which shows the main parts of the digital radio signal receiver of the invention.

Digital radio signal receiver 100 comprises RF part 11 which amplifies radio frequency signals received by an antenna and converts them to intermediate frequency signals by using predetermined frequency signals from a local oscillator, IF part 12 which amplifies the intermediate frequency signals, differential detector part 13 for DQPSK demodulation, P/S part 14 which converts parallel signals to a serial signal, framing part and voice decoder part 15 which generates error information and extracts voice data from the serial signal produced by P/S part 14, speaker 16 which produces a voice based on the voice data, MPU 17 which carries out a retransmission request based on the error information, BTR part 18 which supplies a regenerated synchronous clock signal to P/S part 14, and clock generator 19 which supplies a synchronous clock to BTR part 18.

The above configuration is basically similar to the conventional configuration shown in FIG. 1. However, the following features differ from the conventional configuration.

Differential detector part 13 has shift registers as does the differential detector part 13 in FIG. 1 and outputs a I signal and Q signal. A number bits carried by each shift register of differential detector part 13 are changeable. Differential detector part 13 is provided with a sampling clock selected from clock signals 32$f$, 16$f$, 8$f$ and 4$f$ by sampling clock selector part 20.

Sampling clock selector part 20 selects one clock signal from among a clock signal 32$f$ generated by clock generator 19, and clock signals 16$f$, 8$f$ and 4$f$ obtained by dividing the clock signal 32$f$. Sampling clock selector part 20 supplies a selected clock signal, for example the clock signal 16$f$ which is determined by sampling rate changing part 22, to the differential detector part 13 as the sampling clock.

Error ratio monitoring part 21 calculates a bit error ratio E based on the error information from framing part and voice detector part 15 and monitors the bit error ratio E.

Sampling rate changing part 22 selects a sampling rate based on the bit error ratio E of error ratio monitoring part 21 and changes the sampling rate for an other sampling rate, for example the clock signal 8$f$ of which is generated from sampling clock selector part 20. Therefore, sampling rate changing part 22 changes a number of bits of each shift register in differential detector part 13 to adapt a preferable sampling rate.

Figure 2:
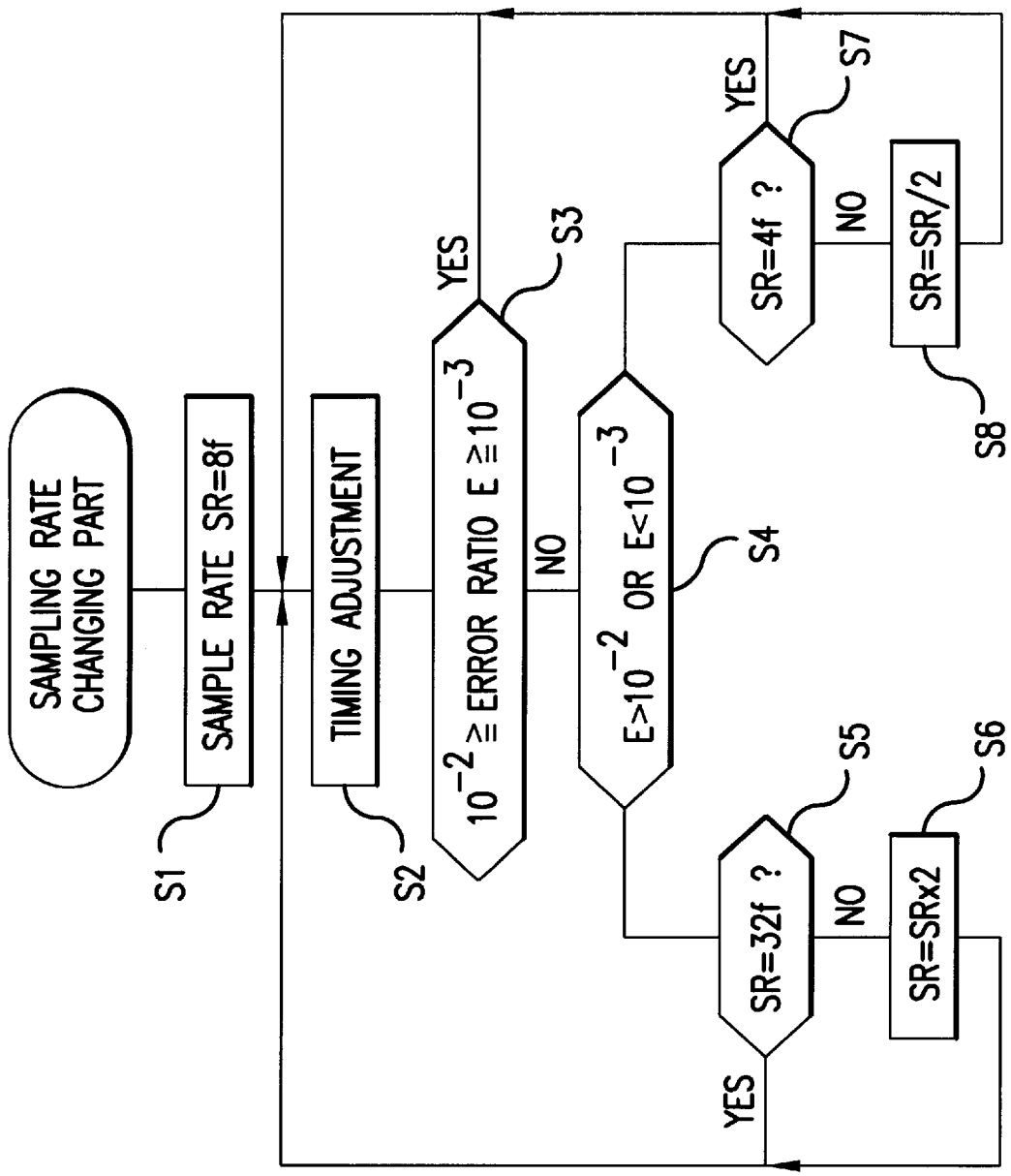
FIG. 2 is a flow chart showing the operation for changing the sampling rate in the digital radio signal receiver shown in FIG.1.
Figure 3:
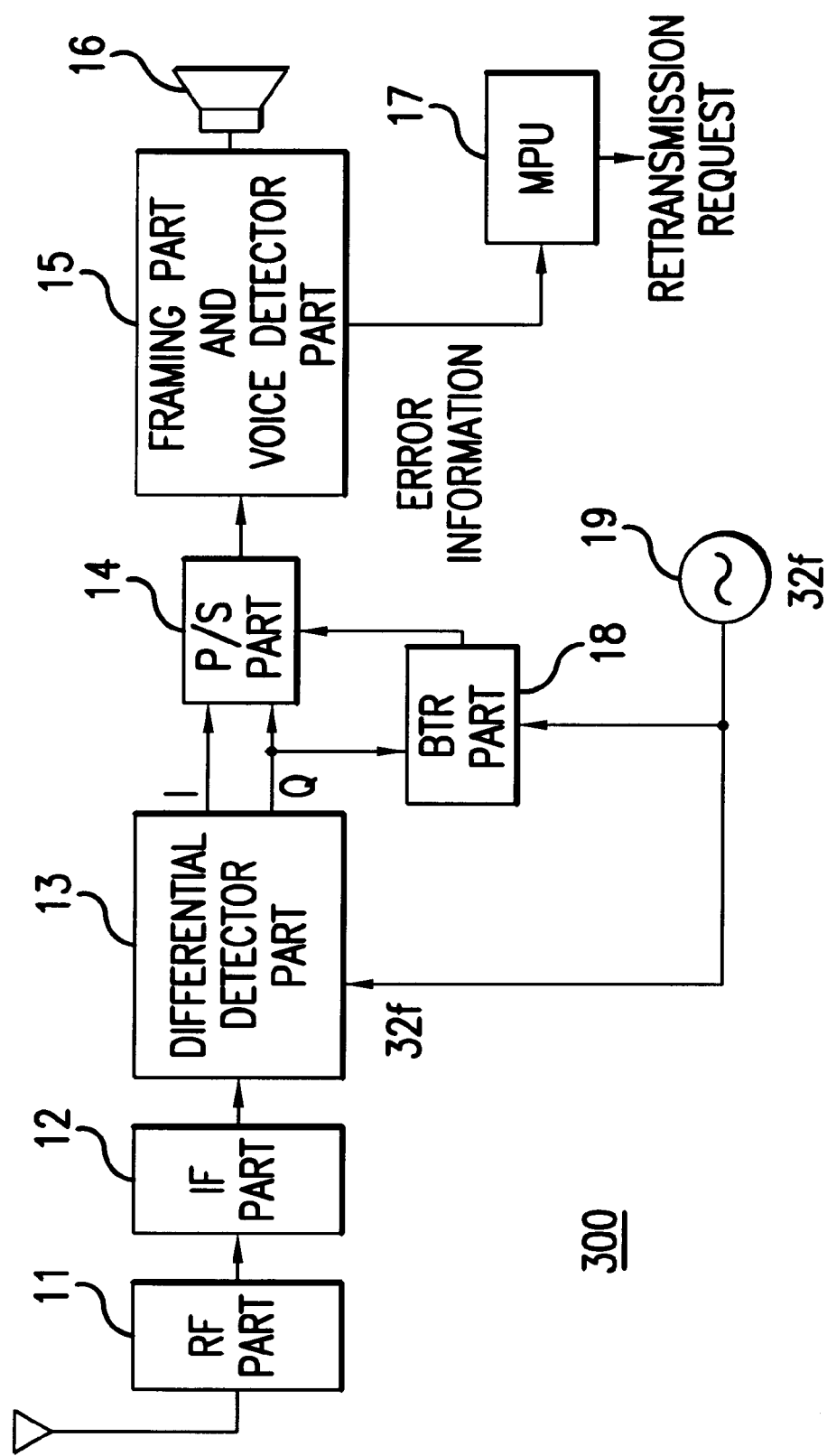
FIG. 3 is a block diagram showing the main parts of the conventional digital radio signal receiver.

FIG. 2 is a flow chart which shows the operation of the sampling rate changing part 22 for selecting the sampling rate.

In step S1, sampling rate changing part 22 is made so that sampling rate SR becomes 8$f$ responsive to the bit error ratio E.

In step S2, the sampling rate changing part 22 makes timing adjustment for receiving new bit error ratio E.

In step S3, sampling rate changing part 22 checks whether bit error ratio E is located between the upper limit i.e. $10^{-2}$ and the lower limit i.e. $10^{-3}$ ($10^{-2} \geq E \geq 10^{-3}$) or not. If so, the operation of sampling rate changing part 22 returns to step S2 for receipt of a next bit error ratio and the present sampling rate SR is held at 8$f$. Otherwise, the operation proceeds to step S4.

In step S4, sampling rate changing part 22 checks whether bit error ratio E is greater than $10^{-2}$ ($E>10^{-2}$) or the ratio E is smaller than $10^{-3}$ ($E<10^{-3}$). If the ratio E is greater than $10^{-2}$ the operation proceeds to step S4. If the ratio E is smaller than $10^{-3}$, the operation proceeds to step S7.

In step S5, sampling rate changing part 22 checks whether the sampling rate SR is set to 32$f$ or not. If the sampling rate SR is set to 32$f$, the operation returns to step S2 without taking any action since the sampling rate SR is already at the highest. If the sampling rate SR is set to 16$f$, smaller than 32$f$ in step S3, the operation proceeds to step S6.

In step S6, sampling rate changing part 22 changes the sampling rate SR into two times higher than the present sampling rate 16$f$ and the operation returns to step S2.

In step S7, sampling rate changing part 22 checks whether the sampling rate SR is set to 4$f$ or not. If the sampling rate SR is 4$f$, the operation returns to step S2 without taking any action since the sampling rate SR is already at the lowest. If the sampling rate SR is greater than 4$f$, the operation proceeds to step S8.

In step S8, the sampling rate changing part 22 changes the sampling rate SR to one half the present sampling rate 8$f$ and the operation returns to step S2 to receive a next bit error ratio.

In digital radio signal receiver 100, the bit error ratio E is kept between $10^{-2}$ to $10^{-3}$ under normal environments, thereby, good voice quality is obtained. Also, since the sampling rate SR can be changed in four steps, namely 32$f$, 16$f$, 8$f$ and 4$f$, the power consumption in differential detection part 13 can be changed in four steps, namely 100%, 50%, 25% and 12.5% (wherein 100% corresponds with the sampling rate 32$f$). Therefore, the power consumption is lowered in comparison to the conventional case in which the sampling rate SR is fixed to 32$f$, and a rate of consumption of batteries contained within digital mobile radiotelephones, digital cellular radiotelephones, digital cordless telephones and similar devices is reduced.

If the sampling rate SR is set to any of sampling clocks 32$f$, 16$f$ and 4$f$ by sampling rate changing part 22, the steps of the operation of part 22 from step S2 to step S8 are respectively repeated to employ a preferable sampling rate.

According to a digital radio communication system of the invention, since the error ratio is kept between the predetermined upper limit and the predetermined lower limit, good voice quality is obtained. Also, since the sampling rate is not increased to unnecessarily high frequency, power saving are be achieved.

What is claimed is:

1. An apparatus for controlling a digital demodulator producing a digital output signal from a digitally modulated input signal sampled by a digital sampler at a digital sampling frequency, the apparatus comprising:

means for detecting and calculating a bit error ratio of data contained in said digital output signal; and frequency control means, responsive to said bit error ratio, for controlling a frequency of said digital sampling frequency to maintain said bit error ratio within a predetermined range in order to minimize power consumption by changing said digital sampling frequency to a higher level when the bit error ratio exceeds a specified upper limit and to a lower level when the bit error ratio falls below a specified lower limit.

2. The apparatus according to claim 1 wherein said digital demodulator includes a sampling clock generator means for producing said digital sampling frequency at integer multiples of a symbol rate.

3. The apparatus of claim 2 wherein said integer multiples include multiples ranging from 4 to 32.

4. The apparatus according to claim 3 wherein said predetermined range extends from about $10^{-2}$ to about $10^{-3}$.

5. An apparatus for controlling a digital demodulator producing a digital output signal from a digitally modulated input signal sampled by a digital sampler at a digital sampling frequency, the apparatus comprising:

means for detecting and calculating a bit error ratio of data contained in said digital output signal; and frequency control means, responsive to said bit error ratio, for controlling a frequency of said digital sampling frequency to maintain said bit error ratio within a predetermined range of about $10^{-2}$ to about $10^{-3}$ in order to minimize power consumption.

6. An apparatus for controlling a digital demodulator producing a digital output signal from a digitally modulated input signal sampled by a digital sampler at a digital sampling frequency, the apparatus comprising:

means for detecting and calculating a bit error ratio of data contained in said digital output signal; and frequency control means, responsive to said bit error ratio, for controlling a frequency of said digital sampling frequency to maintain said bit error ratio within a predetermined range in order to minimize power consumption by changing said digital sampling frequency to a higher level when the bit error ratio exceeds a specified upper limit and to a lower level when the bit error ratio falls below a specified lower limit;

the digital demodulator including a framing and voice detection means for converting said data in said digital output signal into an audible voice reproduction and for supplying a bit error ratio signal to said means for detecting.

7. An apparatus for controlling a digital demodulator producing a digital output signal from a digitally modulated input signal sampled by a digital sampler at a digital sampling frequency, the apparatus comprising:

means for detecting and calculating a bit error ratio of data contained in said digital output signal; and frequency control means, responsive to said bit error ratio, for controlling a frequency of said digital sampling frequency to maintain said bit error ratio within a predetermined range of about $10^{-2}$ to about $10^{-3}$ in order to minimize power consumption;

the digital demodulator including a sampling clock generator means for producing said digital sampling frequency at integer multiples ranging from 4 to 32 of a symbol rate.

8. An apparatus for controlling a digital demodulator producing a digital output signal from a digitally modulated input signal sampled by a digital sampler at a digital sampling frequency, wherein said digital demodulator includes a sampling clock generator means for producing said digital sampling frequency at integer multiples of a symbol rate, the apparatus comprising:

means for detecting and calculating a bit error ratio of data contained in said digital output signal; and frequency control means, responsive to said bit error ratio, for controlling a frequency of said digital sampling frequency to maintain said bit error ratio within a predetermined range from about $10^{-2}$ to about $10^{-3}$ in order to minimize power consumption, said frequency control means including means for setting said digital sampling frequency at a frequency as low as possible while still maintaining said bit error ratio within said predetermined range.

* * * * *